Figure 1:
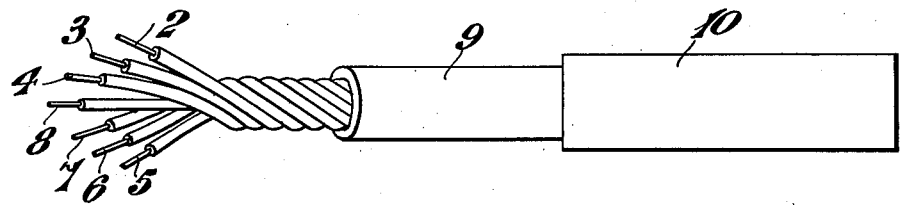

Feb. 6, 1934.  C. E. FOSTER  1,946,155
TEMPERATURE MEASURING DEVICE
Filed July 31, 1929

Inventor
Charles Edwin Foster
By Liverance and
Van Antwerp
Attorneys

Patented Feb. 6, 1934

1,946,155

UNITED STATES PATENT OFFICE 1,946,155

TEMPERATURE MEASURING DEVICE

Charles Edwin Foster, Letchworth, England

Application July 31, 1929, Serial No. 382,448, and in Great Britain December 21, 1928

7 Claims. (Cl. 73—32)

This invention relates to means for indicating supernormal temperatures in silos, and other large zones or spaces, and has for its object to provide improved simple and efficient apparatus for this purpose.

The method of measuring temperature by means of the resultant change in the resistance of a coil of fine wire is well known. The coil of fine wire is usually wound on a bobbin or other support so as to be comprised in a relatively small space and is then known as the "bulb" because it performs the same function as the bulb of a mercury thermometer. The fine wire is of platinum, nickel, copper or any other metal which changes its resistance materially with change in its temperature. This bulb is then submitted to the temperature which is to be measured and is then connected to any convenient form of apparatus which measures resistance.

One of the most common forms of measuring apparatus is the Wheatstone bridge on which the temperature is indicated by the "out of balance" current on the galvanometer dial. All this is well known in the art.

The modification according to my invention is to adapt the "bulb" to measure the average temperature over a large space instead of, as previously, the localized temperature of a small space and the arrangement of the electrical resistance wire in my invention is termed an "elongated bulb".

The system is applicable for indicating the general average temperature of rooms or refrigerators, it is not however, always convenient to make an elongated bulb so long as to approximate the greatest dimension of the room, in some cases a convenient length would be not more than from 3 to 5 feet.

With the normal type of thermometer it is sometimes found in buildings heated by hot water systems that controlling the hot water temperature in terms of the air temperature inside the building is not satisfactory. The system may be "taken by surprise" for instance by the rapid loss of heat from the external walls of the building when there is a quick drop of temperature of the atmosphere.

The first step was to have a resistance "bulb" of the ordinary kind exposed outside the building but the indications of this are relatively slow and the method was not entirely satisfactory.

According to the present invention an electric temperature measuring instrument arranged at any suitable distance from a thermometer bulb is connected by an electric conducting circuit to an elongated bulb formed by or on a length of stranded insulated resistance cable.

The resistance wires may be enclosed in a sheathing or container of lead or other suitable material that will reduce the time lag and increase the speed of response of the bulb, and the wires of the cable may be silk covered resistance wire.

Figure 2:
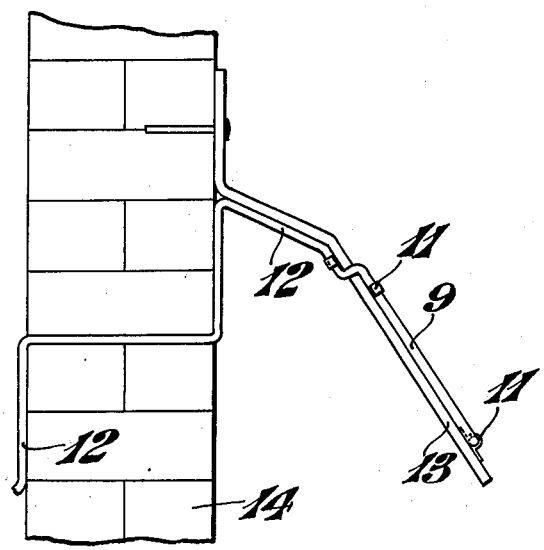
Figure 3:
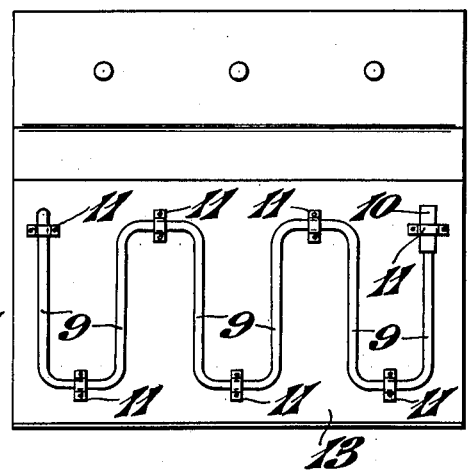
Figure 4:
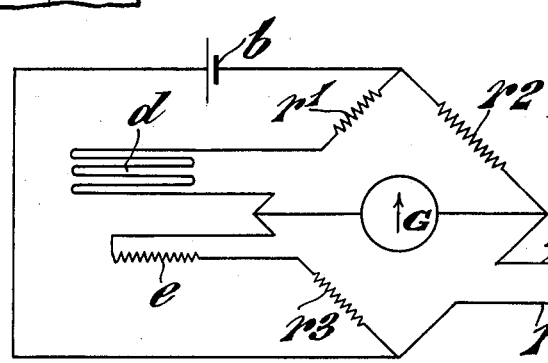

A manner of carrying out the invention is illustrated by the accompanying drawing wherein Figure 1 is a view of the cable of stranded insulated wires, Figure 2 a side elevation of the apparatus as fixed to a wall, Figure 3 a front elevation of the device supported on the wall and Figure 4 a circuit diagram.

In this drawing the cable consists of seven fine wires say silk covered resistance wires 2 to 8, six of these wires 2 to 7 are twisted round a central wire 8. This seven strand cable is enclosed in a flexible lead sheathing 9 so as to form an elongated bulb, and this elongated bulb is secured in a zig-zag manner by means of clips 11 on a plate 13 secured to a wall 14 and extending therefrom in such a manner that the bulb in the sheathing 9 can radiate heat freely.

The elongated bulb in the sheathing 9 is closed at its end by a thimble 10, and the other end is connected by a conductor 12 to an electric temperature measuring instrument.

In the diagram Figure 4 a Wheatstone bridge having a battery $b$ connected across the junction of the arms on opposite sides of the bridge in the usual manner, is applied to a system of automatic control in terms of inside air temperature with "power of anticipation" in terms of change of outside air temperature. The arms on each side of the junctions form two shunt circuits across the galvanometer each divided by its connection to the battery.

To make the matter quite clear the system will be described first with relation to automatic control and without the power of anticipation.

Assuming that the resistances $r1$ and $r3$ of two ratio arms of the Wheatstone bridge are adjusted to be equal, the bridge will be in balance and the pointer of the galvanometer or electric measuring instrument G will be at zero when the resistance $r2$ is adjusted to have the same resistance as an elongated bulb $a$ with the cables $n$ and $p$.

The automatic control is so arranged that when the bridge is in balance and the pointer of the galvanometer G is at zero, no change is made in the heating of the building. When the temperature surrounding $a$ falls its resistance also falls, the Wheatstone bridge is thrown out of balance and the pointer of the galvanometer G will move from zero. The operation of the control then is to increase the heating so as to bring the air temperature back to the desired figure whereby the bridge is again brought into balance. When the air temperature rises above the desired figure the converse operation takes place.

In the application of the invention illustrated by Figure 4 a differential bulb $d$ and a resistance $e$ are placed in circuit between the resistances $r1$ and $r3$ respectively. In this system $d$ is an elongated bulb fixed in such a position outside the building as to be directly exposed to radiation to the north sky as shown at 9, Fig. 3, that is, there are no intervening buildings, trees or anything to form a screen between the bulb 9 (marked $d$ in the diagram Figure 4) and the north sky, and by virtue of its construction and the lead covering, it responds very quickly to the change in temperature. $e$ is, by contrast, a localized bulb of much greater time lag. The term localized thermometer means one situated in any convenient position in which it will not be exposed directly to the sky as distinct from the other outside thermometer having means for preventing time lag.

When conditions outside are stable and there is no such rapid loss by radiation as referred to above $r1+d=r3+e$ and the operation is as described above.

Now assume that up to a given moment the temperature is still steady inside the building at the desired figure but there is such a sudden loss of heat by lowering of the temperature outside. The elongated bulb $d$ will experience this loss of heat and its resistance will fall with a rapid response to the change whereas the localized bulb $e$ will not be affected by such change. This will upset the balance of the bridge in just the same direction as if the temperature of the air surrounding $a$ had fallen thus, with the same setting of the Wheatstone bridge the automatic control will operate to increase the heating in anticipation of the loss of heat which will soon take place in the building.

This out of balance action will persist until the effect of the cold has brought $e$ to the same temperature as $d$ when the bridge will be again in balance and the operation will continue as normally.

It will be obvious that the converse action can take place. The sudden advent of a lower temperature will affect $d$ before it affects $e$, the balance of the bridge will be upset in the reverse direction just as if the temperature surrounding $a$ had already risen and the heating would be reduced.

The amount of resistance in $d$ and $e$ may be adjusted to produce any desired degree of upsetting of the balance, they may each be as large as $a$ or, alternatively, much smaller so as to produce only a small effect.

With such an arrangement the temperature of the air in the building will be maintained at or about a desired figure when conditions are stable with regard to the heat loss through the walls of the building to the outside air. If there is a sudden fall in the outside temperature, particularly such as accompanies a clear sky at sunset with a frost, the heating installation is liable to be "taken by surprise" because it cannot put on more heat until the temperature inside has fallen and by that time the walls have become much colder and a considerable time elapses before the temperature inside is again brought up to normal.

The stranded wire may consist of six wires wound in the usual manner round a central wire as shown in the Figure 1, and where it is desired to dispose the requisite resistance in a relatively short elongated bulb say of a bulb 6 feet long, the centre wire is left dead and the other six connected in series. Alternatively, where it is desired to have the same effective resistance disposed over a longer length the wires may be coupled up in pairs in parallel with a return circuit through the seventh centre wire or in any other system of paralleling so as to reduce the effective resistance per unit length. In this way, with the same size of resistance wire, a given amount of resistance can be extended over lengths up to say 100 feet.

What I claim and desire to secure by Letters Patent is:—

1. A thermometer of the Wheatstone bridge type for indicating the temperature of a building, comprising an electric measuring instrument of the galvanometer type, a battery, resistances in the first, second and fourth arms of the bridge, two elongated thermo-resistance bulbs, a localized resistance bulb, means for reducing the time lag of the elongated bulbs, one of the elongated thermo-resistance bulbs being adapted to be arranged outside the building and coupled in series with the resistance in the first arm of the bridge, the localized bulb being in series with resistance in the fourth arm of the bridge, the other elongated bulb being in the third arm of the bridge while the third resistance is in the second arm of the bridge.

2. A thermometer of the Wheatstone bridge type for indicating the temperature of a building, comprising an electric measuring instrument of the galvanometer type, a battery, resistances in the first, second and fourth arms of the bridge, two elongated thermo-resistance bulbs, a localized resistance bulb, means for reducing the time lag of one of the elongated bulbs, the elongated thermo-resistance bulb provided with means for reducing time lag being adapted to be arranged outside the building and coupled in series with the resistance in the first arm of the bridge, the localized bulb being in series with the resistance in the fourth arm of the bridge, the other elongated bulb being in the third arm of the bridge while the third resistance is in the second arm of the bridge.

3. A thermometer of the Wheatstone bridge type for indicating the temperature of a building, comprising an electric measuring instrument of the galvanometer type, a battery, resistances in the first, second and fourth arms of the bridge, two elongated thermo-resistance bulbs one of which is encased in a lead sheathing, a localized resistance bulb, the lead sheathed bulb being adapted to be arranged outside the building and coupled in series with the resistance in the first arm of the bridge, the localized bulb being in series with the resistance in the fourth arm of the bridge, the other elongated bulb being in the third arm of the bridge while the third resistance is in the second arm of the bridge.

4. A thermometer for giving an indication of a coming change in the temperature of a room due to a change in temperature of the external atmosphere, comprising three electric resistance bulbs, a galvanometer, two shunt circuits connected across the galvanometer, a battery, a resistance, and means for reducing time lag in one of the bulbs, each shunt circuit being divided and the battery being connected to the division points, one of the bulbs being arranged within the room and in series with one of the divisions of one of the shunt circuits, the other two bulbs being outside the room and one of them in series with the other division of the same shunt circuit, the other external bulb being the bulb provided with means for reducing time lag and being in series with one of the divisions of the other shunt circuit, the resistance being in series with the other division of the latter shunt circuit, whereby variations in external temperature will affect the bulb having reduced time lag in advance of the other in order that an indication of the same will be registered by the galvanometer.

5. A thermometer for giving an indication of a coming change in the temperature of a room due to a change in the temperature of the external atmosphere comprising three electric resistance bulbs, a galvanometer, two shunt circuits connected across the galvanometer, a battery, a resistance for each division of each shunt circuit and means for reducing time lag in two of the bulbs, each shunt circuit being divided and the battery being connected to the division points, one of the bulbs provided with time lag reducing means being arranged within the room and forms the resistance in one of the divisions of one of the shunt circuits the other two bulbs being outside the room and the one provided with time lag reducing means arranged to form part of the resistance in the other shunt circuit in the division thereof opposite to that containing the indoor bulb, while the other outdoor bulb forms part of the resistance in the other division of the first mentioned shunt circuit, so that variations in external temperatures will affect the bulb having reduced time lag, in advance of the others and effective to register same at the galvanometer.

6. A thermometer for giving an indication of a coming change in the temperature of a room due to a change in the temperature of the external atmosphere, comprising three electric resistance bulbs, a galvanometer, two shunt circuits connected across the galvanometer, a battery, three resistances, and means for reducing time lag in one of the bulbs, each shunt circuit being divided and the battery being connected to the division points, and three of them each provided with a resistance, one of the bulbs being arranged within the room and in series with the division of the shunt circuits, not containing a resistance, the other two bulbs being outside the room and one of them in series with the other division of the same shunt circuit, the division being provided with one of the resistances, while the other external bulb is in series with one of the divisions of the other shunt circuit, and is the bulb provided with means for reducing time lag, the division being provided with one of the resistances while the third resistance is in series with the other division of the latter shunt circuit, so that variations in external temperature will affect the bulb having reduced time lag, in advance of the others and effective to register same at the galvanometer to operate normally by responding to changes of temperature in the room.

7. A thermometer of the Wheatstone bridge type for indicating the temperature of a building, comprising an electric measuring instrument of the galvanometer type, a battery, resistances in three arms of the bridge, two resistance bulbs, a localized resistance bulb, means for reducing the time lag of one of the bulbs, one of the resistance bulbs being adapted to be arranged outside the building and provided with the means for reducing time lag and coupled in series with the resistance in one arm of the bridge, while the localized bulb is in series with the resistance of the adjacent arm connected to the same end of the bridge, the other resistance bulb being in an arm at the other end of the bridge also connected to the arm containing the localized bulb, the third resistance being in the arm connecting this end of the bridge with the arm containing the external bulb.

CHARLES EDWIN FOSTER.